US008116360B2

(12) United States Patent
Thibeault

(10) Patent No.: US 8,116,360 B2
(45) Date of Patent: Feb. 14, 2012

(54) METHOD AND APPARATUS FOR PREVENTING LOSS OF SERVICE FROM HARDWARE FAILURE IN A NETWORK

(75) Inventor: Brian K. Thibeault, Attleboro, MA (US)

(73) Assignee: General Instrument Corporation, Horsham, PA (US)

( * ) Notice: Subject to any disclaimer, the term of this patent is extended or adjusted under 35 U.S.C. 154(b) by 1182 days.

(21) Appl. No.: 11/240,114

(22) Filed: Sep. 30, 2005

(65) Prior Publication Data

US 2007/0076789 A1    Apr. 5, 2007

(51) Int. Cl.
*H04B 1/38* (2006.01)
*H04L 7/00* (2006.01)
*H04L 27/00* (2006.01)

(52) U.S. Cl. .......................... 375/220; 375/356; 375/316

(58) Field of Classification Search .................. 375/220, 375/222, 224, 219, 295, 316, 356; 455/423, 455/424, 425, 435.1, 435.2; 370/229, 237, 370/252, 216, 217, 221, 225–227; 340/825.01; 725/105, 106
See application file for complete search history.

(56) References Cited

U.S. PATENT DOCUMENTS

| 4,245,342 | A * | 1/1981 | Entenman ................ 340/825.01 |
| 4,385,392 | A * | 5/1983 | Angell et al. ............ 340/825.01 |
| 6,230,326 | B1 * | 5/2001 | Unger et al. ................... 725/111 |
| 6,556,660 | B1 * | 4/2003 | Li et al. ........................ 379/15.01 |
| 6,662,368 | B1 * | 12/2003 | Cloonan et al. ............... 725/111 |
| 6,839,829 | B1 | 1/2005 | Darauwalla et al. |
| 7,072,365 | B1 * | 7/2006 | Ansley .......................... 370/535 |
| 7,684,315 | B1 * | 3/2010 | Beser ............................ 370/219 |
| 2003/0120819 | A1 | 6/2003 | Abramson et al. |
| 2004/0261119 | A1 | 12/2004 | Williams et al. |
| 2005/0058082 | A1 * | 3/2005 | Moran et al. .................. 370/252 |

FOREIGN PATENT DOCUMENTS

WO    02/33974 A1    4/2002

OTHER PUBLICATIONS

EPC Extended Search Report, RE: Application #06800803.6-2224/1935104 PCT/US2006030554; Jul. 5, 2010.
PCT International Search Report and Written Opinion for PCT/US06/30554. Dated Sep. 21, 2007.

* cited by examiner

*Primary Examiner* — Tesfaldet Bocure
(74) *Attorney, Agent, or Firm* — Brian G. Brannon

(57) ABSTRACT

A spare receiver in a CMTS is used to prevent loss of service to subscribers during a failure of a receiver. The beginning of a mass modem de-registration event is detected by the operator or automatically by the CMTS. Upon detection of the beginning of the mass modem de-registration event, the spare receiver matrices to the troubled receiver and is configured according the communication parameters of the troubled receiver. The spare receiver sends communications to one or modems normally registered with the troubled receiver to determine if the mass de-registration event is the result of a failed receiver or a connection problem. In the event of a failed receiver, the spare receiver stays matriced with the troubled receiver and passes communications to/from from modems normally registered with it. The cable operator may swap out the troubled receiver and repair the system without significant loss of service to the subscribers.

20 Claims, 4 Drawing Sheets

METHOD AND APPARATUS FOR PREVENTING LOSS OF SERVICE FROM HARDWARE FAILURE IN A NETWORK

FIELD OF THE INVENTION

This invention relates to a method and apparatus for network failure prevention using a spare receiver. This invention more particularly relates to detecting failure of a receiver and replacing the failed receiver with a spare receiver to prevent connectivity loss to subscribers.

BACKGROUND

Coaxial cable television systems have been in widespread use for many years and extensive networks have been developed. The extensive and complex networks are often difficult for a cable operator to manage and monitor. A typical cable network generally contains a headend which provides content to a cable modem termination system (CMTS) containing several receivers, each receiver is usually connected to modems of many subscribers, e.g., a single receiver may be connected to hundreds of modems. In many instances the operator will cable multiple receivers together to serve a particular area of a town or city.

Whenever the CMTS detects that the frequency a receiver is currently using has communication problems, such as having high noise levels, a cable operator may move one or more modems to a different receiver. Cable operators often use Load Balancing Groups to equalize the load of the traffic across receivers, and Spectrum Groups to allocate multiple upstream frequencies to a receiver. In order to have receivers belong to the same Load Balancing Group or Spectrum Group they must be physically connected together. Multiple frequencies in a Spectrum Group may be used for frequency agility. The CMTS can determine which "backup" frequency is the best to use and retune the receiver in the Spectrum Group to the new frequency with no interruption to cable subscribers.

Cable networks are also increasingly carrying signals which require a high quality and reliability of service, such as voice communications or Voice over IP (VoIP) communications. Any disruption of voice or data traffic is a great inconvenience and often unacceptable to a subscriber. If a receiver is running fine, then all the modems and media terminal adapters (MTAs) will be passing data and voice without problems. However if one receiver fails in the CMTS unit, or an external device goes bad in the CMTS, then all of the modems and MTAs will deregister from that receiver, causing subscriber loss of service. If there are no other receivers in the same spectrum group or load balancing group available, then these modems will not register again until an operator in the headend re-wires the RF or replaces the failed CMTS receiver card.

Accordingly, there exists a need to prevent loss of service to subscribers when a receiver fails.

SUMMARY

This invention prevents loss of service to a large number of subscribers when a receiver fails.

This invention also provides diagnostic information to the cable operator when modem de-registration occurs.

In accordance with the present invention, an apparatus for preventing loss of service in network may include: a plurality of receivers, each receiver being capable of receiving signals according to predetermined communication protocols from a plurality of modems; a switching unit which selectively connects a spare receiver to a signal line associated with one of the plurality of receivers, enabling the spare receiver to receive signals sent to a selected one of the plurality of receivers from a modem associated with the selected one of the plurality of receivers; and a controller configured to instruct the switching unit to connect the spare receiver to a communication line of a troubled receiver of the plurality of receivers in response to the beginning of a mass modem deregistration event for modems registered with the troubled receiver, and configured to configure the spare receiver to communicate with modems associated with the troubled receiver.

In an apparatus of the present invention, a controller may be further configured to detect mass modem deregistration.

In an apparatus of the present invention, a controller may be further configured to instruct the spare receiver to send a communication request signal to one or more modems associated with the troubled receiver. If the spare receiver receives a response communication from the one or more modems in a predetermined period of time, the spare receiver remains connected to the communication line of the troubled receiver, and the controller provides an indication to an operator that there is a receiver failure. If the spare receiver does not receive a response communication from the one or more modems in a predetermined period of time, the spare receiver is disconnected from the communication line of the troubled receiver, and the controller provides an indication to an operator that there is a connection problem.

In accordance with the present invention, a method of preventing loss of service in network having a plurality of receivers, each receiver being capable of receiving signals according to predetermined communication protocols from a plurality of modems, the method may include the steps of: detecting mass modem deregistration of modems associated with a troubled receiver of the plurality of receivers; connecting a spare receiver to a communication line of the troubled receiver of the plurality of receivers in response to the beginning of a mass modem deregistration event for modems registered with the troubled receiver; configuring the spare receiver to communicate with modems associated with the troubled receiver.

A method of the present invention may further include the step of determining if the troubled receiver was intentionally brought to a down state by an operator.

A method of the present invention may further include sending a communication request signal to one or more modems associated with the troubled receiver from the spare receiver. If the spare receiver receives a response communication from the one or more modems in a predetermined period of time, the method may include keeping the spare receiver connected to the communication line of the troubled receiver, and providing an indication to an operator that there is a receiver failure. If the spare receiver does not receive a response communication from the one or more modems in a predetermined period of time, the method may include disconnecting the spare receiver from the communication line of the troubled receiver, and providing an indication to an operator that there is a connection problem.

In accordance with the present invention, a computer readable medium may contain instructions for a processor to perform a method of preventing loss of service in network having a plurality of receivers, each receiver being capable of receiving signals according to predetermined communication protocols from a plurality of modems, the method may include the steps of: detecting mass modem deregistration of modems associated with a troubled receiver of the plurality of receivers; connecting a spare receiver to a communication line of the troubled receiver of the plurality of receivers in response to the beginning of a mass modem deregistration event for modems registered with the troubled receiver; configuring the spare receiver to communicate with modems associated with the troubled receiver.

A computer readable medium of the present invention may further include instructions to determine if the troubled receiver was intentionally brought to a down state by an operator.

A computer readable medium of the present invention may further include instructions to send a communication request signal to one or more modems associated with the troubled receiver from the spare receiver. If the spare receiver receives a response communication from the one or more modems in a predetermined period of time, the computer readable medium may further include instructions to keep the spare receiver connected to the communication line of the troubled receiver, and to provide an indication to an operator that there is a receiver failure. If the spare receiver does not receives a response communication from the one or more modems in a predetermined period of time, the computer readable medium may further include instructions to disconnect the spare receiver from the communication line of the troubled receiver, and to provide an indication to an operator that there is a connection problem.

The invention allows a cable operator to avoid a significant loss of service to subscribers in the event of a receiver or hardware failure, except for a few initial modem de-registrations to initiate the process. The cable operator may also make repairs at their convenience without loss of service to a subscriber. The cable system may be able to maintain a high level of reliability and quality, which may be especially important for voice communications, such as VoIP communications being handled by the cable system.

DETAILED DESCRIPTION OF THE DRAWINGS

To solve the problems of the prior art, a spare or 9th receiver in an eight receiver unit may be used. The spare receiver preferably may tap in where the cable signal comes into the receiver ports so the spare receiver can receive the same signal as the receiver being tested. Preferably, the spare receiver can matrix with only one primary receiver at a time.

Figure 1:
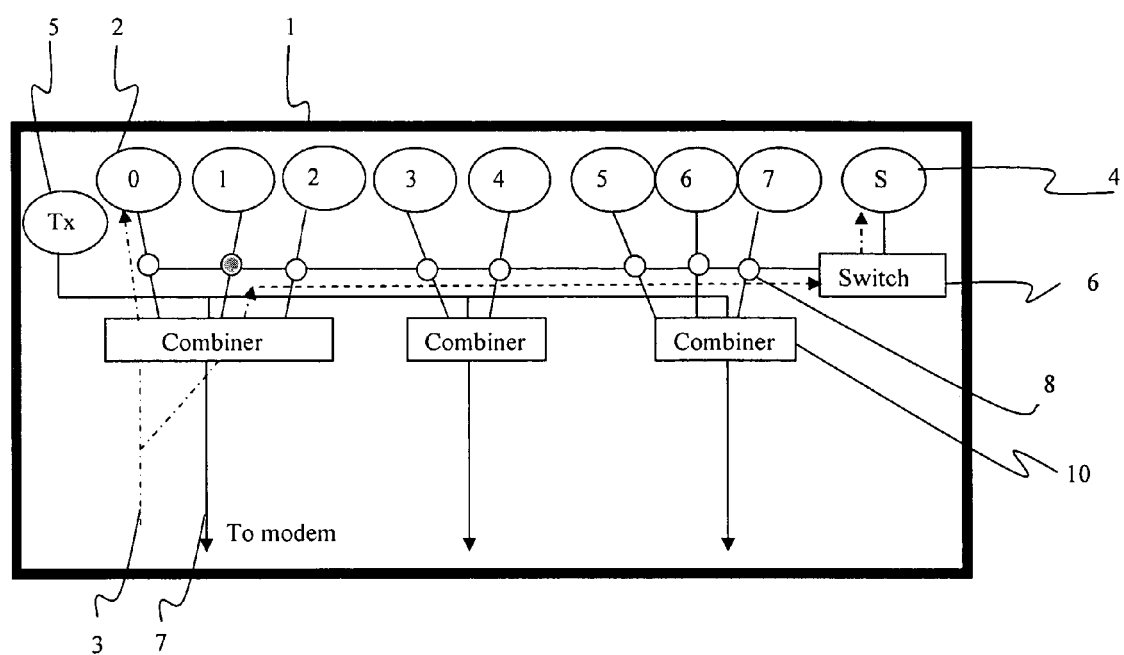
FIG. 1 illustrates an exemplary architecture of a CMTS in accordance with the principles of the invention.

FIG. 1 illustrates an exemplary CMTS 1 with primary receivers 2 (R0-R7), which may be a Motorola BSR64000 CMTS. A transmitter unit 5 is also illustrated which serves to transmit signals to modems of the users (not shown) via signal path 7 and combiner 10. Transmitter unit 5 may be a single transmitter or multiple transmitters. Those of skill in the art will appreciate that transmitter unit 5 preferably transmits to the modems according to predetermined communication protocols, such as Data Over Cable Systems Interface Specification (DOCSIS) protocols.

While eight receivers are shown, those of skill in the art will appreciate that any number of receivers may be used. In the exemplary illustration, receivers R0, R1 and R2 are in one Load Balancing Group, receivers R3 and R4 are in another group and R5, R6 and R7 are in the last group. The spare receiver 4 can preferably tap into any one receiver R0-R7 at a time and, in the example of FIG. 1, is tapped into receiver 1 via tap 8. Combiner 10 receives signals from user modems and provides them to receivers 2 (R0-R7). Dotted line 3 depicts the return path that a response from a cable modem (not shown) to receiver R0 would take in the exemplary implementation of FIG. 1. Those of skill in the art will appreciate that the CMTS is used generally to refer to any suitable modem termination system, that the architecture illustrated is exemplary and any type of cabling (connections) may be used, such as coaxial wires, optical fibers, twisted pairs, and wireless connections.

Figure 2:
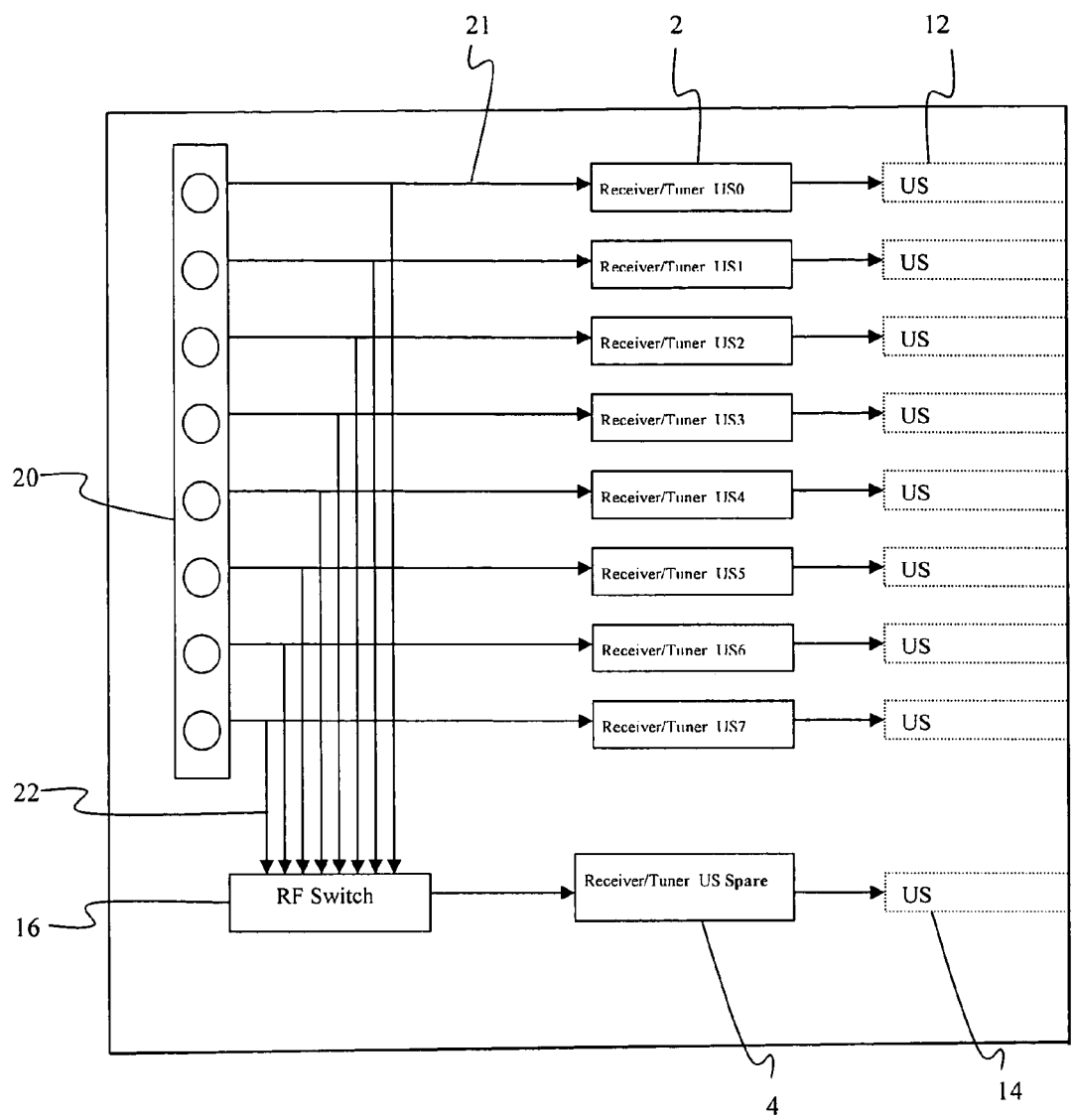
FIG. 2 illustrates an exemplary configuration for connecting a spare receiver in an exemplary CMTS in accordance with the principles of the invention.

FIG. 2 illustrates the spare receiver 4 tapped into each of primary receiver ports 2 (e.g. R0-R7) in a non-intrusive manner. As illustrated, CMTS receiver ports 20, which may be in the form of Amphenol connectors, are provided to allow cables, e.g. coaxial cables, (not shown) to be connected with primary receivers 2. As also illustrated, signals from the headend are preferably provided through ports 20 to receivers 2 and demodulators 12.

Spare receiver 4 preferably taps into signal lines 21 of primary receiver ports 20 via signal lines 22, and the taps are preferably located where the cable signal comes from receiver ports 20 into the receivers 2 so both the connected primary receiver 2 and the spare receiver 4 may receive the same signal. Those of skill in the art will appreciate that each of the primary receivers 2 (e.g. receivers R0-R7) receive signals according to different communication characteristics, e.g. communication on a different frequency (RF band) and communication protocols. Spare receiver 4 is preferably tunable to the RF bands of each of the primary receivers 2. Preferably, the spare receiver 4 connects (matrices) with only one primary receiver 2 at a time.

Figure 3:
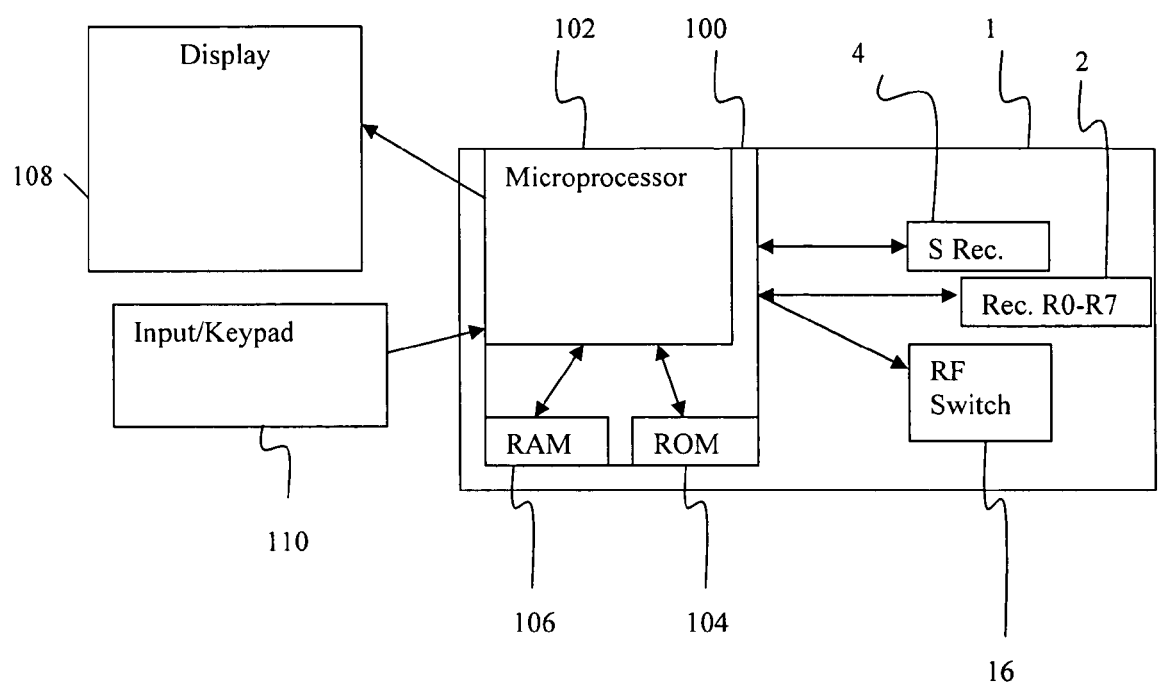
FIG. 3 illustrates an exemplary processing unit in accordance with the principles of the invention.

FIG. 3 illustrates an exemplary processing unit 100 contained in the CMTS. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a receiver is in the same Load Balancing Group or Spectrum Group as another selected primary receiver. An input keypad 110 may also be connected to processing unit 100 and may allow an operator to provide instructions, processing requests and/or data to processor 100. Microprocessor 102 is preferably configured to provide instructions to RF switch 16 (FIG. 2) to select a primary receiver to be analyzed and select other receivers as the UUT in accordance with the processes illustrated in FIG. 4. Microprocessor 102 is also preferably configured to configure spare receiver 4 to match the communication characteristics of the selected primary receiver. The communication characteristics of each receiver 2 may be stored on ROM 104 or RAM 106, or may be provided from an external source, such as the headend. RAM 104 and/or ROM 106 may also carry instructions for microprocessor 102 to perform the processes illustrated in FIG. 4.

Figure 4:
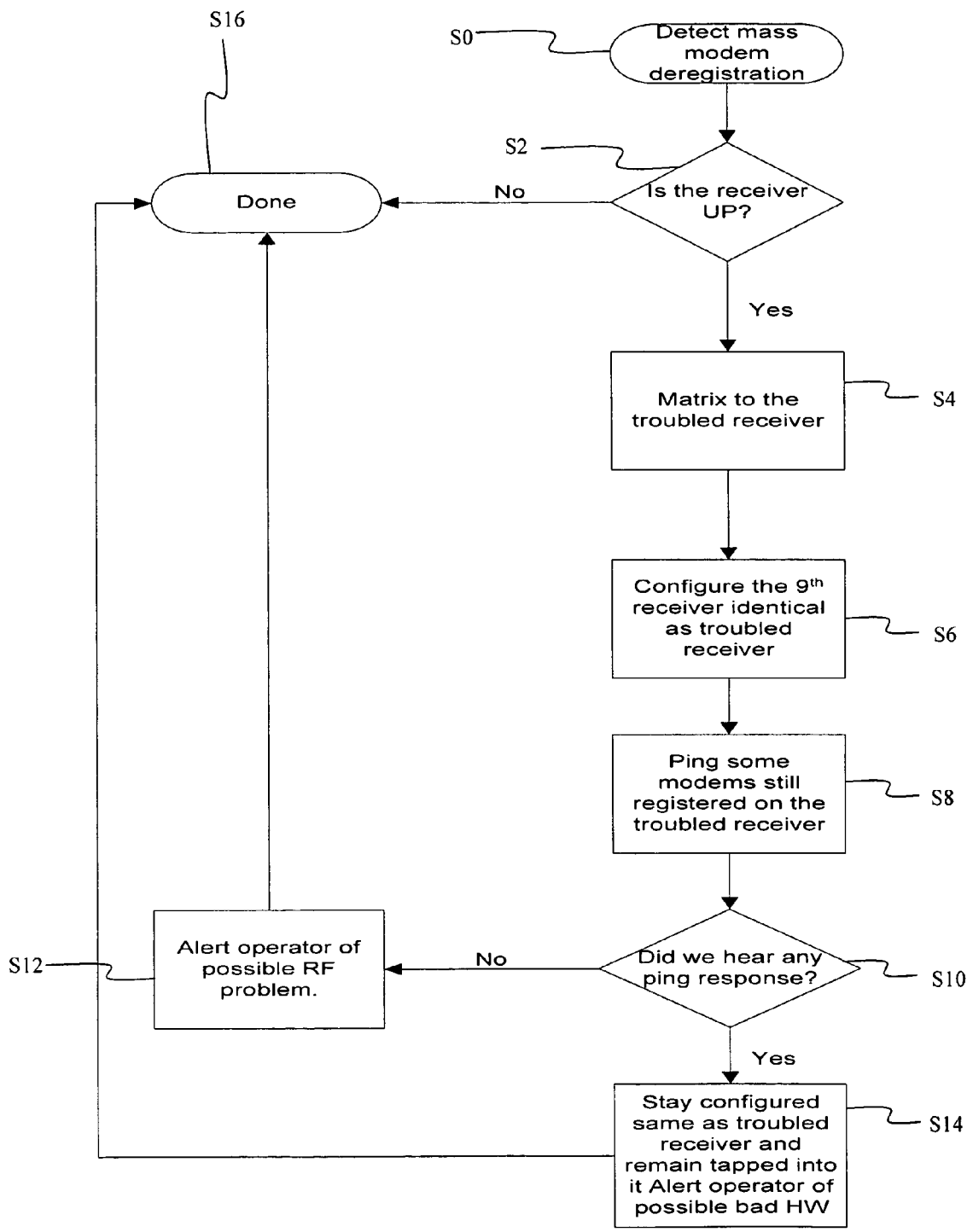
FIG. 4 illustrates an exemplary flow diagram of an exemplary process for determining using a spare receiver for redundancy according to the principles of the invention.

FIG. 4 illustrates an exemplary process to use the spare receiver for redundancy. The process in FIG. 4 preferably may serve to prevent mass de-registration in the event of hardware failure, e.g. a receiver failure. As illustrated in FIG. 4, the process initiates upon detection of the beginning of a mass modem de-registration event, step S0. A mass modem de-registration event may be detected by the operator monitoring the cable system or automatically by microprocessor 102 by detecting if a certain number of modems start to deregister over a short period of time, e.g. modems M within time T, M/T. The number of de-registering modems within the period of time may be compared with a threshold TH, and mass de-registration is determined if the threshold is exceeded, e.g. M/T>TH. If the mass modem de-registration event is detected, the process determines if the receiver involved, (the troubled receiver) is operating and in the UP state (e.g. online condition), step S2. If the troubled receiver is not in the UP state, such as being intentionally shut down by the cable operator and placed in the DOWN state, step S2, NO, then the process ends, step S16. If the troubled receiver is in the UP state, step S2, YES, then the spare receiver is matriced (connected) to the troubled receiver, step S4, e.g. connected to the RF signal of the troubled receiver by RF switch 16 (FIG. 2). As illustrated in step S6 the tunable spare receiver is preferably configured to the same communication parameters as the troubled receiver, including being configured to communication characteristics of the same RF band and communication protocols (e.g. MAP data) utilized by the troubled receiver. In this manner, the spare receiver preferably is configured to receive communications directed toward the troubled receiver.

As illustrated in step S8, one or more modems are selected which are registered, or supposed to be registered, on the troubled receiver, and a communication request signal requesting a response from the modems is sent to the selected modems. Those of skill in the art will appreciate that the communication signal may be a "ping", a station maintenance request or any other signal requesting a response. The communication request signal may be sent to any number of modems associated with the troubled receiver. Preferably, the communication request signal is provided to several modems to determine if the mass de-registration is the result of a bad, disconnected or broken cable or connection, in which case the troubled receiver has not failed and the spare receiver does not need to take over for the troubled receiver.

Because the spare receiver is configured to have the same communication characteristics as the troubled receiver, when the modem(s) responds to the communication request, the spare receiver detects the response, if any. If the spare receiver detects the modem response, step S10 Yes, then the troubled receiver is determined to have a failure and the spare receiver stays matriced to the RF of the troubled receiver to thereby pass communications (e.g. data and voice) to/from modems normally registered with the troubled receiver, step S14, and the process ends, step S16. Since certain responses may be expected within a predetermined period of time, the process may preferably determine if a response has been received within a predetermined period of time after the communication request. Preferably, the process alerts the cable operator of a possible hardware problem, e.g. that the receiver has failed, so appropriate repairs may be implemented. If the spare receiver does not receive a response from the modems, step S10 No, then the troubled receiver may not have failed, and the modem de-registration may be due to a connectivity problem, e.g. RF problem. The operator is preferably alerted of the connectivity problem, step S12, and the process ends, step S16.

The processes in FIG. 4 may be implemented in hardwired devices, firmware or software running in a processor. A processing unit for a software or firmware implementation is preferably contained in the CMTS. The processes illustrated in FIG. 4 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

Those of skill in the art will appreciate using the spare receiver as a redundant receiver will allow a cable operator to avoid a significant loss of service to subscribers, except the initial modem de-registration to initiate the process of FIG. 4. Those of skill in the art will also appreciate that the spare receiver, as a redundant receiver, may also allow modems which have deregistered from the troubled receiver to register with the spare receiver and provide service to their respective subscribers. The cable operator may also make repairs at their convenience without loss of service to a subscriber. The cable system may be able to maintain a high level of reliability and quality, which may be especially important for voice communications, such as VoIP communications being handled by the cable system.

Those of skill in the art will appreciate that other modifications may be implemented without departing from the scope and spirit of the invention. For example, a variety of techniques may be used to detect a hardware failure, such as receiving information of failure from the CMTS receiver card itself, in which case the spare receiver may be simply matriced with the failed receiver to pass communications normally handled by the failed receiver.

What is claimed is:

1. An apparatus for preventing loss of service in network comprising:
   a plurality of receivers, each receiver being capable of receiving signals according to predetermined communication protocols from a plurality of modems;
   a switching unit which selectively connects a spare receiver to a signal line associated with one of the plurality of receivers, enabling the spare receiver to receive signals sent to a selected one of the plurality of receivers from a modem associated with the selected one of the plurality of receivers; and
   a controller configured to instruct the switching unit to connect the spare receiver to a communication line of a troubled receiver of the plurality of receivers in response to a beginning of a mass modem deregistration event for modems registered with the troubled receiver, and configured to configure the spare receiver to communicate with modems associated with the troubled receiver by sending a communication request signal to one or more modems associated with the troubled receiver, wherein the sending is performed after the configuration of the spare receiver to communicate with modems associated with the troubled receiver, in response to the determination of the mass modem deregistration event, and wherein the beginning of a mass modem registration event is determined to have occurred by the controller when a number of modems associated with the troubled receiver that de-register within a specified time period exceeds a specified threshold.

2. The apparatus of claim 1, wherein the controller is configured to keep the spare receiver connected to the communication line of the troubled receiver if the spare receiver receives a response to the communication request signal from the one or more modems in a predetermined period of time after the communication request signal is sent.

3. The apparatus of claim 1, wherein the controller provides an indication to an operator that there is a receiver failure.

4. The apparatus of claim 1, wherein the controller is configured to instruct the switching unit to disconnect the spare receiver from the communication line of the troubled receiver if the spare receiver does not receive a response to the communication response signal from the one or more modems in a predetermined period of time after the communication response signal is sent.

5. The apparatus of claim 4, wherein the controller provides an indication to an operator that there is a connection problem.

6. The method of claim 1, wherein the controller is further configured to determine whether the troubled receiver was intentionally brought to a down state by an operator, and when the troubled receiver was intentionally brought down by an operator, to not configure the spare receiver to communicate with the modems associated with the troubled receiver.

7. A method of preventing loss of service in network having a plurality of receivers, each receiver being capable of receiving signals according to predetermined communication protocols from a plurality of modems, the method comprising the steps of:
  detecting a beginning of a mass modem deregistration event for modems associated with a troubled receiver of the plurality of receivers wherein the beginning of a mass modem event is determined to have occurred when a number of modems associated with the troubled receiver that de-register within a specified time period exceeds a specified threshold;
  connecting a spare receiver to a communication line of the troubled receiver of the plurality of receivers in response to the mass modem deregistration of modems registered with the troubled receiver;
  configuring the spare receiver to communicate with modems associated with the troubled receiver by sending a communication request signal to one or more modems associated with the troubled receiver from the spare receiver, wherein the sending is performed after the configuration of the spare receiver to communicate with modems associated with the troubled receiver in response to the determination of the beginning of the mass modem deregistration event.

8. The method of claim 7, further comprising the step of determining if the troubled receiver was intentionally brought to a down state by an operator.

9. The method of claim 7, wherein the method further comprises the condition of not performing the step of configuring the spare receiver to communicate with modems associated with the troubled receiver when the troubled receiver was intentionally brought down by an operator.

10. The method of claim 7, wherein, if the spare receiver receives a response to the communication request signal from the one or more modems in a predetermined period of time after the communication request signal is sent, the method further comprises the step of keeping the spare receiver connected to the communication line of the troubled receiver.

11. The method of claim 10, further comprising the step of providing an indication to an operator that there is a receiver failure.

12. The method of claim 7, wherein if the spare receiver does not receive a response to the communication request signal from the one or more modems in a predetermined period of time after the communication request signal is sent, the method further comprises the step of disconnecting the spare receiver from the communication line of the troubled receiver.

13. The method of claim 12, further comprising the step of providing an indication to an operator that there is a connection problem.

14. A non-transitory computer readable medium that is one of a machine and a manufacture bearing instructions for a processor to perform a method of preventing loss of service in network having a plurality of receivers, each receiver being capable of receiving signals according to predetermined communication protocols from a plurality of modems, the method comprising the steps of:
  detecting a beginning of a mass modem deregistration event for modems associated with a troubled receiver of the plurality of receivers wherein the beginning of a mass modem deregistration event is determined to have occurred when a number of modems associated with the troubled receiver that de-register within a specified time period exceeds a specified threshold;
  connecting a spare receiver to a communication line of the troubled receiver of the plurality of receivers in response to the mass modem deregistration of modems registered with the troubled receiver;
  configuring the spare receiver to communicate with modems associated with the troubled receiver by sending a communication request signal to one or more modems associated with the troubled receiver from the spare receiver, wherein the sending is performed after the configuration of the spare receiver to communicate with modems associated with the troubled receiver in response to the determination of the beginning of the mass modem deregistration event.

15. The non-transitory computer readable medium of claim 14, further comprising instructions to perform the step of determining if the troubled receiver was intentionally brought to a down state by an operator.

16. The non-transitory computer readable medium of claim 15, further comprising instructions to keep the spare receiver connected to the communication line of the troubled receiver if the spare receiver receives a response to the communication request signal from the one or more modems in a predetermined period of time after the communication request signal is sent.

17. The non-transitory computer readable medium of claim 16, further comprising instructions to perform the step of providing an indication to an operator that there is a receiver failure.

18. The non-transitory computer readable medium of claim 15, further comprising instructions to disconnect the spare receiver from the communication line of the troubled receiver if the spare receiver does not receive a response to the communication request signal from the one or more modems in a predetermined period of time after the communication request signal is sent.

19. The non-transitory computer readable medium of claim 18, further comprising instructions to perform the step of providing an indication to an operator that there is a connection problem.

20. The non-transitory computer readable medium of claim 15, wherein the instructions comprise a condition of not performing the step of configuring the spare receiver to communicate with the modems associated with the trouble receiver when the troubled receiver was intentionally brought down by an operator.

* * * * *